(12) United States Patent
Hecht et al.

(10) Patent No.: US 7,682,109 B2
(45) Date of Patent: Mar. 23, 2010

(54) CUTTING TOOL, TOOL BODY AND CUTTING INSERT THEREFOR

(75) Inventors: Gil Hecht, Nahariya (IL); Oleg Kertsman, Kiryat Yam (IL)

(73) Assignee: Iscar, Ltd., Tefen (IL)

( * ) Notice: Subject to any disclaimer, the term of this patent is extended or adjusted under 35 U.S.C. 154(b) by 148 days.

(21) Appl. No.: 12/142,168

(22) Filed: Jun. 19, 2008

(65) Prior Publication Data
US 2009/0035075 A1 Feb. 5, 2009

(30) Foreign Application Priority Data
Aug. 5, 2007 (IL) .................................. 185047

(51) Int. Cl.
*B23P 15/28* (2006.01)
*B23B 27/16* (2006.01)
(52) U.S. Cl. .................. 407/102; 407/104; 407/113
(58) Field of Classification Search .............. 407/102, 407/104, 107, 108, 113–116, 33, 42, 48
See application file for complete search history.

(56) References Cited

U.S. PATENT DOCUMENTS

| | | | |
|---|---|---|---|
| 4,509,886 A * | 4/1985 | Lindsay | 407/102 |
| 5,004,379 A * | 4/1991 | Little | 407/113 |
| 5,159,863 A | 11/1992 | Simpson | |
| 5,411,354 A * | 5/1995 | Gustafsson | 407/110 |
| 5,709,508 A | 1/1998 | Barazani et al. | |
| 5,810,518 A | 9/1998 | Wiman et al. | |
| 5,820,310 A | 10/1998 | Boianjiu | |
| 6,071,045 A * | 6/2000 | Janness | 407/42 |
| 6,244,789 B1 | 6/2001 | Tsuda | |
| 7,052,214 B2 * | 5/2006 | Janness | 407/35 |
| 7,094,006 B2 * | 8/2006 | Hecht | 407/102 |
| 2004/0005199 A1 * | 1/2004 | Janness | 407/35 |

FOREIGN PATENT DOCUMENTS

| DE | 20 2005 016610 | 12/2005 |
|---|---|---|
| EP | 1657012 | 5/2006 |
| JP | 2007 175843 | 7/2007 |

OTHER PUBLICATIONS

International Search Report PCT/IL2008/000939, dated Dec. 8, 2008.

* cited by examiner

*Primary Examiner*—Will Fridie, Jr.
(74) *Attorney, Agent, or Firm*—Womble Carlyle

(57) ABSTRACT

A cutting tool has a tool body and a cutting insert releasably retained in a pocket of the tool body. The cutting insert has first and second rear insert abutment surfaces and a third forward insert abutment surface and the pocket has first and second rear pocket abutment surfaces and a third forward pocket abutment surface. The first and second abutment surfaces are separated from the third abutment surface by a bore. The third forward pocket abutment surface can be either a socket recessed in a pocket base surface or a protrusion protruding from the base surface; and the third forward insert abutment surface can be correspondingly either a protrusion protruding from an inner surface of the insert or a socket recessed in the inner surface.

17 Claims, 10 Drawing Sheets

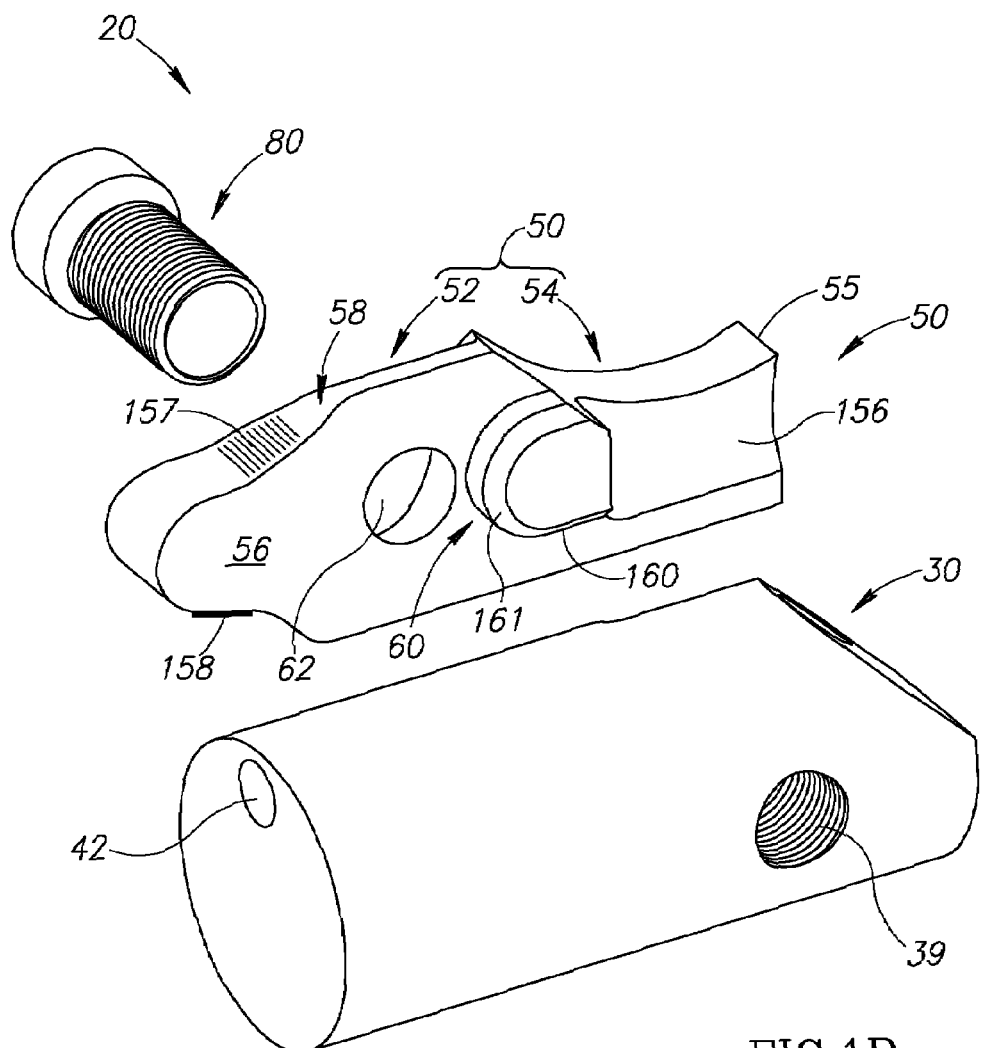
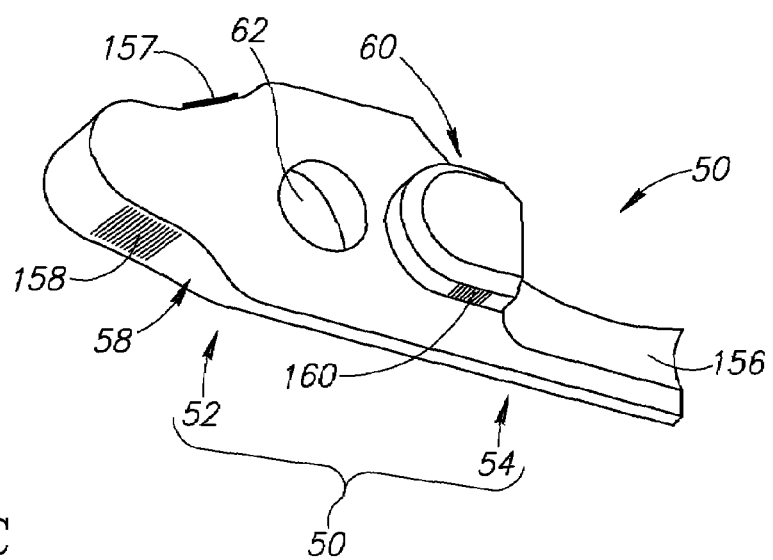
FIG.1B
FIG.1C

CUTTING TOOL, TOOL BODY AND CUTTING INSERT THEREFOR

FIELD OF THE INVENTION

The invention relates to cutting tools having a tool body with a replaceable cutting insert mounted therein.

BACKGROUND OF THE INVENTION

Cutting tools used to shape a surface of a work piece in milling, turning or grooving operations may comprise a replaceable cutting insert that is mounted at an end of a relatively long, rod-like tool body or insert holder. The tool body has a cutting portion having an insert pocket for mounting the cutting insert therein and a shank at an end opposite to the cutting portion for securing the cutting tool in a tool holder of a machine tool.

In a face-shaping or face-grooving operations, a surface at an end of the work piece that is usually substantially perpendicular to the axis about which the work piece rotates is, respectively, shaped and/or formed with a groove. The surface being shaped or grooved may be an internal surface, relatively deep inside the work piece and a groove being formed in a surface may be a relatively deep groove. For such operations, the cutting tool and insert must be appropriately shaped so that the insert can be inserted into the work piece to a sufficient depth to reach the surface being shaped or the groove being formed. Whereas the cutting tool and insert must have substantial reach, it is generally advantageous that they be sufficiently robust so that in use they are not subject to excessive vibration that prevents them from shaping surfaces of acceptable quality.

However, providing a cutting tool with relatively large reach needed for shaping or grooving an internal surface may affect the robustness of the tool. The cutting tool and/or insert must often be shaped relatively long but having a relatively small cross section. In addition, surfaces of the cutting tool that are close to a curved surface being worked must generally be curved so that they do not contact and interfere with the surface. As a result, it may be difficult for the cutting tool to provide robust mechanical support for the cutting insert near the cutting tool's cutting edge.

To meet design constraints of cutting tools used for face-shaping or face-grooving, the cutting insert retained in these tools may be mounted therein using an adapter. The adapter may be shaped to be mounted on an end of the tool body and may be configured to receive the cutting insert in a suitable insert pocket formed in the adapter. The adapter may be configured with various component support structures for stabilizing the cutting tool and reducing its tendency to vibrate during use and may comprise means for clamping the cutting insert in the pocket. The adaptor may also include means for adjusting the position of the cutting insert in the pocket. Typically, various configurations of bolts are used to secure the components of the adapter to the tool body and to provide the clamping and adjustment functions.

U.S. Pat. No. 5,159,863 describes "an adjustable face-grooving tool holder for holding a cutting insert for cutting circular face grooves having widely differing diameters". The holding tool comprises a "blade unit" to which a cutting insert is mounted and a "clamping arm" that is mounted on the blade unit using a screw that is tightened to clamp the cutting insert to the blade unit. The blade unit is mounted to the tool body using another screw.

U.S. Pat. No. 5,709,508 describes a cutting tool assembly having an adaptor that is mounted to a tool block using a pair of bolts.

U.S. Pat. No. 6,244,789 describes a cutting tool for cutting the walls of small deep holes. The tool comprises a cutting insert secured to a holder, or tool body. The cutting insert has a "stick-shaped" cutting portion that extends away from a planar plate-like base. The cutting portion has a cutting edge at a far end from the base. Near the center of the base is a bolt through hole which is aligned with a tapped hole in the holder. The cutting insert is secured to the holder by bolting the base into an insert pocket in the holder using a fixing bolt which is inserted through the bolt through hole and screwed into the tapped hole. The pocket has a seating surface on which a planar surface of the plate-like base rests and three projections that extend from peripheral surfaces of the pocket to contact a peripheral side surface of the base along three regions of the base peripheral surface. The cutting insert is clamped at four points. In addition to the three-point contact by the three projections, the insert is also clamped by a set bolt which is fitted through a tapped hole to make contact with the base peripheral side surface. When the set bolt in the tool body is screwed down to contact a fourth region of the base peripheral side surface, the insert "is locked at four points by the three projections . . . and the set bolt".

SUMMARY OF THE INVENTION

An aspect of an embodiment of the invention, relates to providing a tool body and insert such that when the insert is mounted to the tool body, forces are generated between surfaces of the tool body and the insert that align the insert with the tool body.

According to an aspect of some embodiments of the invention, the forces generate a torque that presses an abutment surface of the insert against an abutment surface of the tool body thereby substantially fixing the orientation of the insert and its cutting edge relative to the tool body.

An aspect of an embodiment of the invention relates to providing a tool body and groove-cutting insert for which the insert is mounted directly to the tool body. In an embodiment of the invention, the tool body has a pocket comprising a base surface and a back wall surface formed at a rear end of the pocket. The cutting insert comprises a mounting portion from which a cutting portion having a cutting edge extends. The mounting portion of the cutting insert has an inner surface that corresponds to the base surface of the pocket and a peripheral surface of the mounting portion corresponds to the pocket's back wall surface. The pocket formed in the tool body is formed having a forward male or female part having a pocket abutment surface and the mounting portion of the insert is formed having a matching forward female or male part respectively that has an insert abutment surface.

The cutting insert is mounted to the tool body by placing the mounting portion of the insert in the tool body pocket with the male part inserted into the female part and with the inner and peripheral surfaces of the insert mounting portion adjacent to or substantially in contact with, respectively, the base and back wall surfaces of the pocket. The inner surface of the mounting portion of the insert is then forced against the base surface of the pocket optionally using a single threaded bolt to clamp the inner and base surfaces together. In accordance with an embodiment of the invention, the back wall surface of the pocket and the corresponding peripheral surface of the mounting portion of the insert are formed such that when the insert is mounted in the pocket, two abutment surfaces of the back wall surface are brought into forcible contact with two abutment surfaces of the peripheral surface. The abutment surfaces are oriented so that forces between the abutment surfaces generate a torque that causes the cutting insert to be securely retained in the pocket. The single clamping bolt thus securely mounts the cutting insert to, and aligns the insert with, the tool body.

In a particular application of the invention, the cutting insert is a face-grooving cutting insert configured to cut a circular groove in a face surface of a work piece. The cutting edge of the insert's cutting portion is substantially perpendicular to a radius of curvature of the groove and is located at a region of the cutting portion farthest from the mounting portion of the insert. The cutting portion is defined at least in part by inner and outer cylindrical surfaces that are closer respectively to walls of the groove having smaller and larger radii of curvature.

In accordance with the present invention there is provided a cutting tool comprising: a cutting insert comprising a cutting portion and a mounting portion, the mounting portion comprising:

inner and outer surfaces and a peripheral surface extending therebetween;

a through bore passing through the inner and outer surfaces;

first and second insert abutment surfaces located on the peripheral surface, the first and second insert abutment surfaces being situated at a greater distance from the cutting portion than the throughbore; and a third insert abutment surface located adjacent the inner surface, spaced apart from the peripheral surface and situated closer to the cutting portion than the throughbore;

and a tool body having a pocket comprising:

a base surface;

a back wall surface oriented transversely to the base surface and forming a partial boundary of the base surface at a rear end thereof;

first and second pocket abutment surfaces situated on the back wall surface;

a third pocket abutment surface oriented transversely to the base surface and spaced apart from the back wall surface; and a threaded bore in the base surface situated closer to a front surface of the tool body than the first and second pocket abutment surfaces and further from the front surface than the third pocket abutment surface;

wherein the cutting insert is releasably retained in the pocket by a clamping bolt located in the through bore and threadingly received in the threaded bore and the first second and third insert abutment surfaces abut the first, second and third pocket abutment surfaces, respectively.

In accordance with one embodiment, the third insert abutment surface is situated in a socket recessed in the inner surface of the mounting portion of the cutting insert and the third pocket abutment surface is located on a protuberance protruding from the pocket base surface.

In accordance with another embodiment, the third insert abutment surface is situated on a protuberance protruding from the inner surface of the mounting portion of the cutting insert and the third pocket abutment surface is situated in a socket recessed in the pocket base surface.

BRIEF DESCRIPTION OF FIGURES

The invention will be more clearly understood by reference to the following description of exemplary embodiments thereof read in conjunction with figures attached hereto. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale. The figures are listed below.

FIG. 1B schematically shows an exploded perspective view of the cutting tool shown in FIG. 1A from a substantially opposite direction;

FIG. 1C schematically shows a perspective view of the cutting insert shown in FIGS. 1A and 1B, in accordance with an embodiment of the invention;

DETAILED DESCRIPTION OF THE INVENTION

Figure 1A:
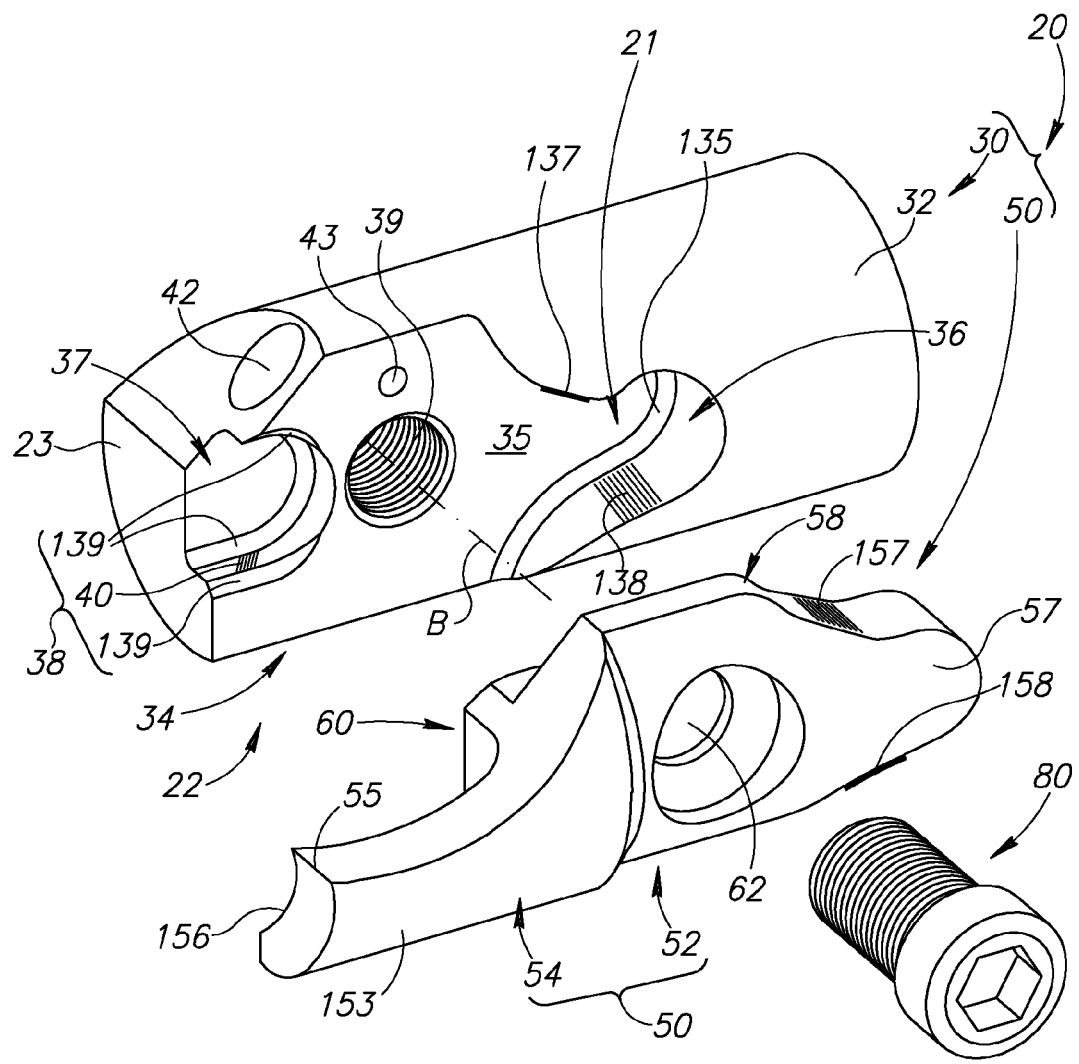
FIG. 1A schematically shows an exploded perspective of a cutting tool, in accordance with an embodiment of the invention.

FIGS. 1A to 2C schematically show perspective exploded views of a cutting tool 20 comprising a tool body 30 and a cutting insert 50, in accordance with an embodiment of the invention. The tool body 30 may be made of a first hard material and the cutting insert 50 of a second hard material that is harder than the first hard material. For example, the tool body 30 may be made of steel and the cutting insert 50 may be made of a hard metal such as, for example, a cemented carbide. The tool body 30 may have a circularly cylindrical cross section. FIGS. 1A and 1B respectively show cutting tool 20 from a side of tool body 30 on which cutting insert 50 is mounted and from a side of the tool body opposite to that on which the cutting insert is mounted. By way of example, cutting insert 50 may be a face-grooving insert. The cutting tool 20 has a longitudinal axis A defining a front to rear direction of the cutting tool 20. The longitudinal axis A may be an axis of rotation of the cutting tool if it is used in rotating cutting operations.

Tool body 30 has a mounting shank 32 for mounting in a tool holder of a machine tool and a pocket 34 for receiving cutting insert 50. Pocket 34 is formed having an optionally substantially planar base surface 35 and a back wall surface 36 formed at rear end 21 of pocket 34. Back wall surface 36 is oriented transversely to base surface 35 and optionally comprises a bevel surface 135 adjacent base surface 35. Therefore, the back wall surface 36 forms a partial boundary of the base surface 35 at the rear end 21 of pocket 34. Two rear pocket abutment surfaces 138 and 137 are located on the back wall surface 36. The figures are only schematic and mounting shank 32 may be longer than shown.

A female part, a socket 37, having a socket wall surface 38 is optionally formed at a front end 22 of pocket 34 adjacent a front surface 23 of tool body 30 and a threaded bore 39 for receiving a clamping bolt 80 is optionally formed substantially perpendicular to base surface 35 between socket 37 and back wall surface 36. Threaded bore 39 has a bore axis B. Socket wall surface 38 is optionally bounded along its length by bevel surfaces 139. A section of the socket wall surface 38 comprises a forward pocket abutment surface 40. Optionally, tool body 30 is formed having a channel 42 for leading coolant to insert 50 when cutting tool 20 is used to cut a groove in a work piece. Optionally, a shunt hole 43 diverts a portion of the coolant flowing in channel 42 to base surface 35. Socket 37 opens out to base surface 35 of pocket 34 and may also open out to front surface 23 of tool body 30. The forward pocket abutment surface 40 is oriented transversely to the base surface 35.

Cutting insert 50 is formed having a mounting portion 52 from which a cutting portion 54 comprising a cutting edge 55 extends. As seen in FIGS. 1A-1C, the cutting insert 50 has unitary integral one-piece construction with the cutting portion 54 constituting a forward portion of the cutting insert 50 and the mounting portion 52 constituting a rearward portion of the cutting insert 50. Cutting portion 54 optionally has an outside curved surface 153 and an inside curved surface 156. Inside side surface 156 determines a largest radius groove that the cutting insert 50 can be used to cut and outside curved surface 153 defines a smallest radius groove that the cutting insert 50 can be used to cut. Mounting portion 52 has an inner surface 56 (FIG. 1B) and an opposing outer surface 57 (FIG. 1A). The inner surface 56 mates with base surface 35 of pocket 34 and is optionally substantially planar. Mounting portion 52 has a peripheral surface 58 that is adjacent to and partially abuts to back wall surface 36 of tool body 30 when the cutting insert is secured to the tool body 30. First and second rear insert abutment surfaces 157 and 158, respectively, are located on peripheral surface 58 and correspond to first and second rear pocket abutment surfaces 137 and 138, respectively. Peripheral surface 58 extends between the inner surface 56 and the outer surface 57. The peripheral surface 58 is transverse to the inner and outer surfaces 56 and 57. A reference plane P of cutting tool 20 is defined by longitudinal axis A and bore axis B. Reference plane P may be a median plane of mounting portion 52 of the cutting insert 50. First and second rear insert abutment surfaces 157 and 158, respectively, are located on opposite sides of peripheral surface 58 and on opposite sides of reference plane P. First and second rear pocket abutment surfaces 137 and 138 are located on opposite sides of the back wall surface 36 and on opposite sides of reference plane P.

Optionally, a male part, a protuberance 60, which substantially matches socket 37 in tool body 30, protrudes from inner surface 56 of mounting portion 52 of insert 50 near to where cutting portion 54 joins mounting portion 52 of the insert. Protuberance 60 is optionally formed having an insert abutment surface 160 that abuts forward pocket abutment surface 40 of socket 37 when insert 50 is mounted on tool body 30 as described below. Protuberance 60 is optionally formed having a bevel surface 161. A through bore 62 for receiving bolt 80 is formed transverse to inner surface 56. The through bore 62 may be formed perpendicular to inner surface 56. The protuberance 60, and consequently the insert abutment surface 160, is located closer to the cutting portion 52 than the through bore 62. The insert abutment surfaces 157, 158 and 160 form first, second and third insert abutment surfaces, respectively, of the cutting insert 50 in accordance with a first embodiment and the pocket abutment surfaces 137, 138 and 40 form first, second and third pocket abutment surfaces, respectively, of pocket 34 of the tool body 30 in accordance with the first embodiment.

Figure 2A:
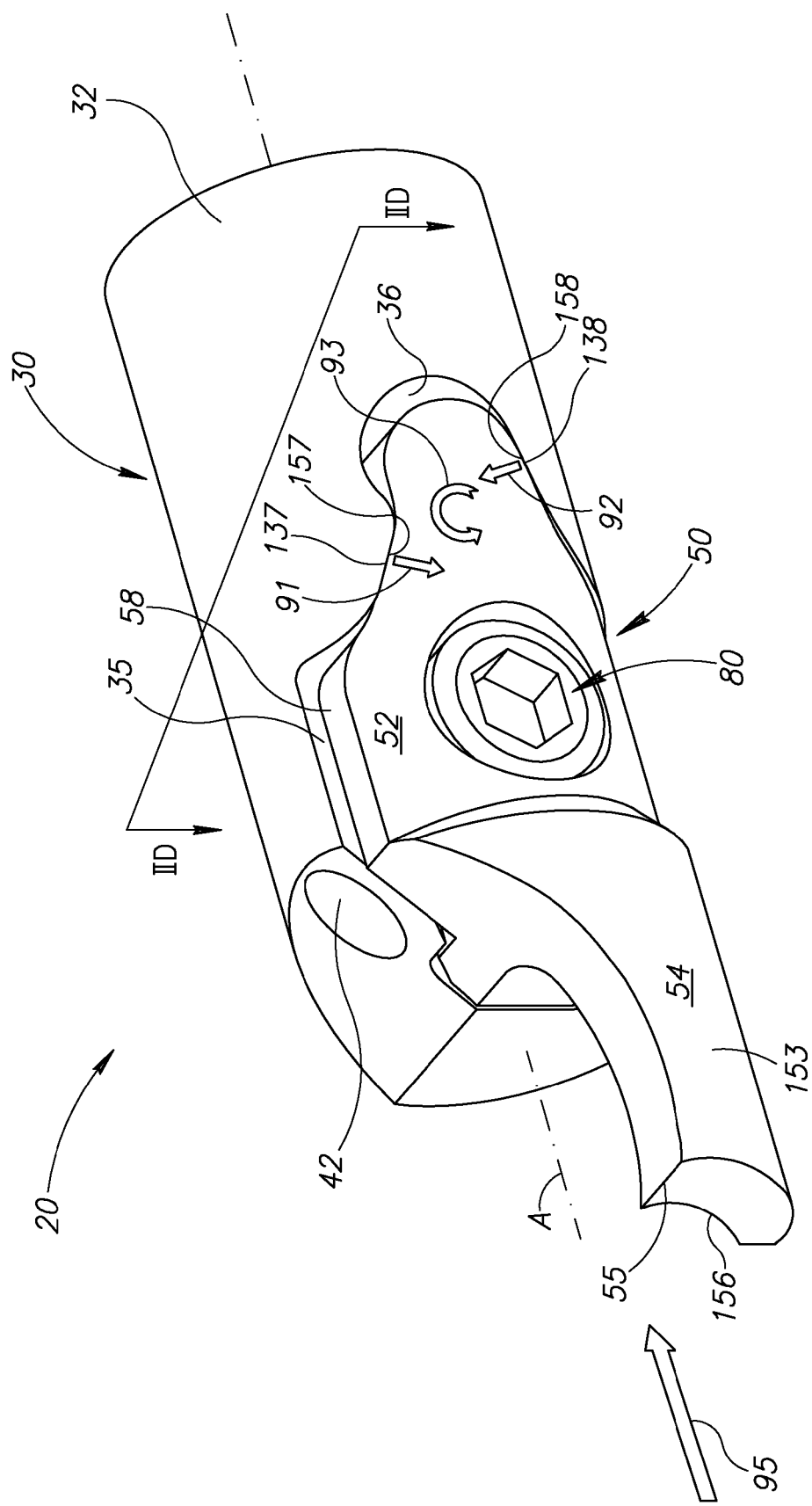
FIG. 2A schematically shows a perspective view of the assembled cutting tool shown in FIGS. 1A and 1B.
Figure 2B:
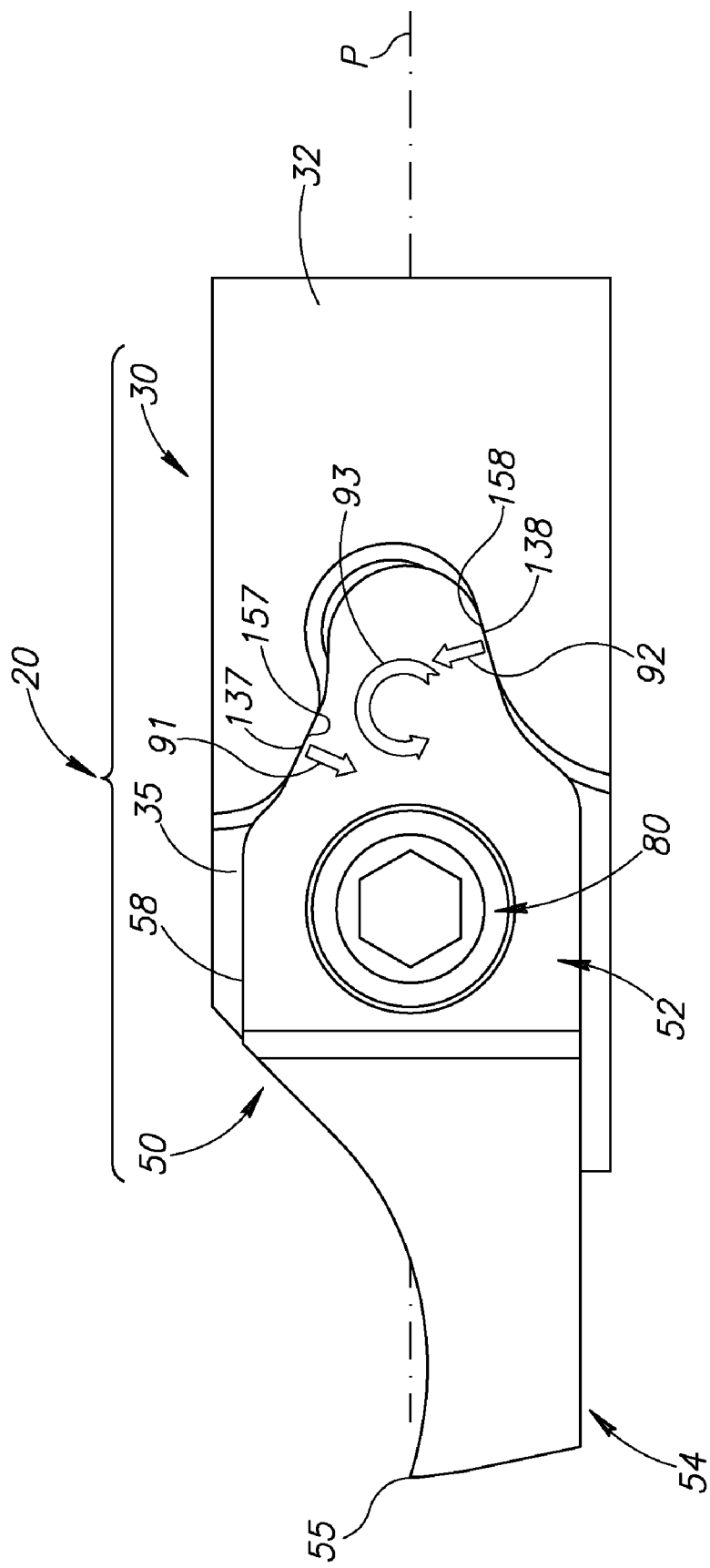
FIG. 2B schematically shows a side view of the assembled cutting tool shown in 2A.

Cutting tool 20 is assembled by aligning mounting portion 52 of cutting insert 50 with pocket 34, inserting the mounting portion into the pocket 34, placing the clamping bolt 80 in the through bore 62 and screwing clamping bolt 80 into threaded bore 39 so that the clamping bolt secures the mounting portion into the pocket 34. FIGS. 2A and 2B schematically show perspective and side views of cutting tool 20 assembled. First and second rear insert abutment surfaces 157, 158 are oriented at an acute angle to each other and converge rearwardly, that is, in a direction away from the cutting edge 55 (see, FIG. 2B). Similarly, first and second rear pocket abutment surfaces 137, 138 are oriented at an acute angle to each other and converge rearwardly, that is, a direction away from the front surface 23 of the tool body 30.

Figure 2C:
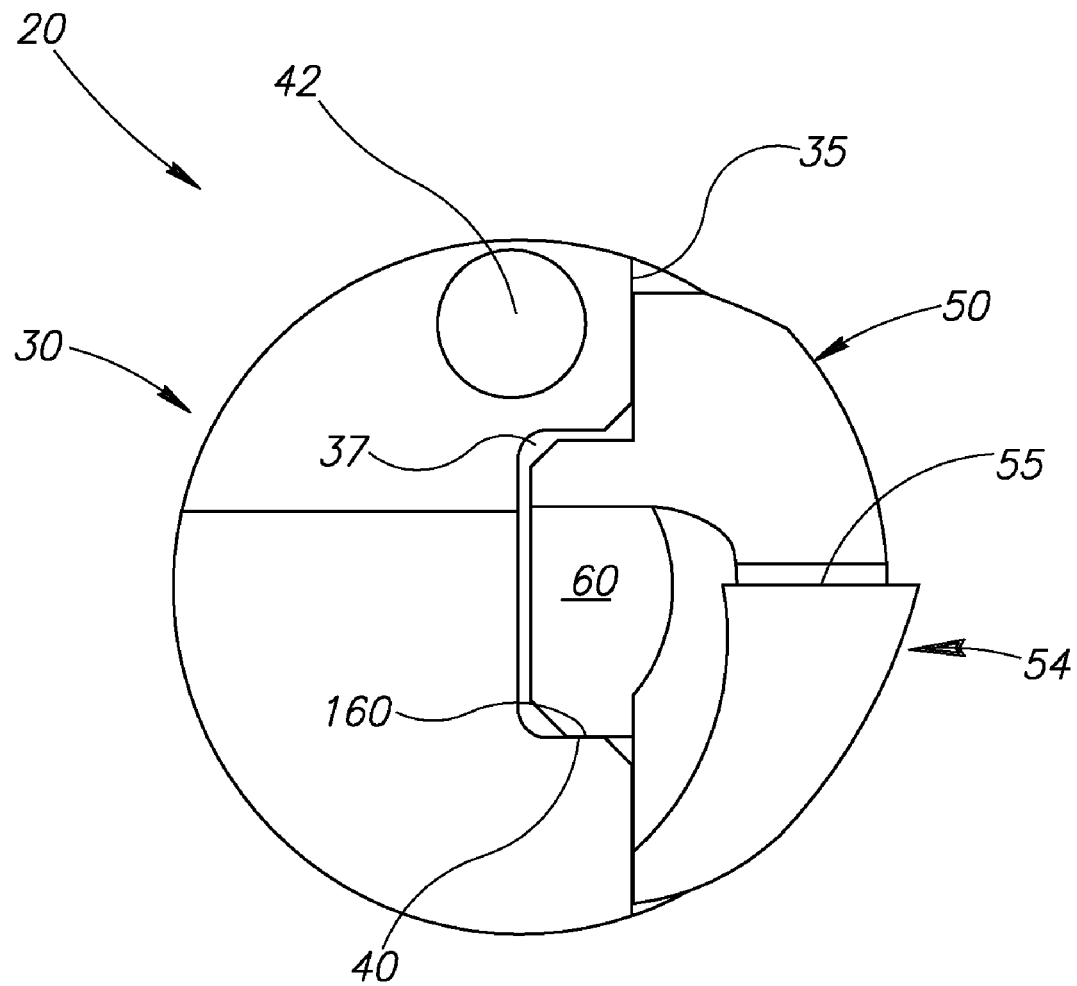
FIG. 2C schematically shows an end view of the assembled cutting tool shown in FIG. 2A.

In accordance with an embodiment of the invention, peripheral surface 58 of cutting insert 50 and back wall 36 of pocket 34 are configured so that when cutting insert 50 is mounted in pocket 34, the peripheral surface 58 contacts tool body 30 substantially only at rear pocket abutment surfaces 137 and 138 of pocket 34. Regions of the cutting insert peripheral surface 58 that contact rear pocket abutment surfaces 137 and 138 of pocket 34 are respectively rear insert abutment surfaces 157 and 158 of the cutting insert 50. Contact between first rear abutment surfaces 137 and 157 generates a force on cutting insert 50 schematically represented by block arrow 91. Contact between second rear abutment surfaces 138 and 158 generates a force on the cutting insert schematically represented by block arrow 92. Forces 91 and 92 generate a torque represented by circular block arrow 93. In an embodiment of the invention, torque 93 operates to rotate cutting insert 50 and forcibly press insert abutment surface 160 of the cutting insert on forward pocket abutment surface 40 of the tool body as shown in FIG. 2C which schematically shows a front end view of cutting tool 20 from a direction indicated by a block arrow 95 in FIG. 2A in which insert abutment surface 160 of protuberance 60 abuts forward pocket abutment surface 40 of socket 37. As a result, when clamping bolt 80 clamps cutting insert 50 in pocket 34 the cutting insert 50 is stably mounted in the pocket 34 and accurately positioned relative to tool body 30 by base surface 35 of the pocket 34 and by contact with three surfaces, pocket abutment surfaces 137, 138 and 40.

In some embodiments of the invention, rear abutment surfaces 137, 138, 157 and 158 are configured so that as clamping bolt 80 is screwed into threaded bore 39, forces 91 and 92 between the abutment surfaces of the cutting insert and the tool body increase. For example, the abutment surfaces might be angled relative to an axis (for example, axis B) about which clamping bolt 80 is rotated in order to screw the clamping bolt into threaded bore 39 to provide forces that increase as the bolt is screwed into hole 39 and cutting insert is mounted more tightly to tool body 50.

Figure 2D:
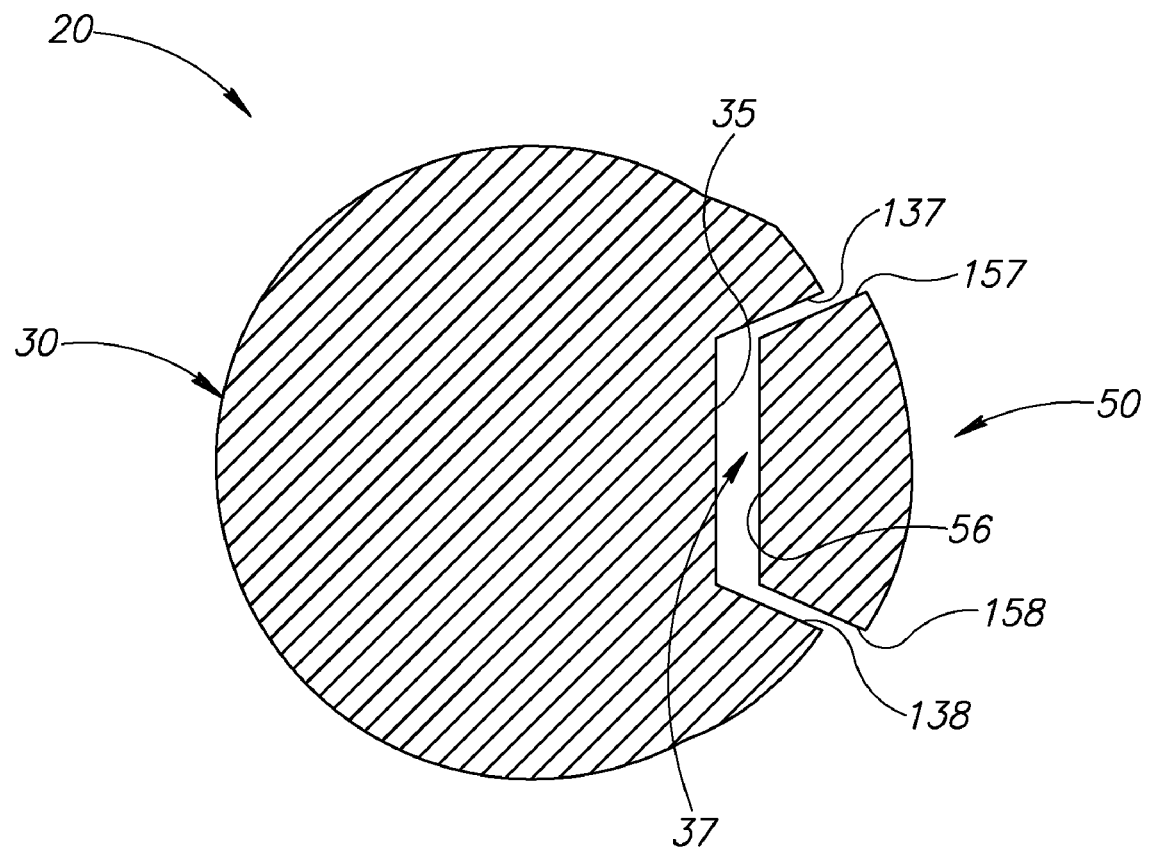
FIG. 2D shows a schematic cross section view taken in a plane perpendicular to the cutting tool's longitudinal axis A indicated by a line IID-IID in FIG. 2A.

FIG. 2D shows a schematic cross section view of cutting tool 20 in accordance with some embodiments. As can be seen, rear abutment surfaces 137, 138, 157 and 158 are radially outwardly angled so that forces 91 and 92 increase as cutting insert is clamped more tightly into pocket 37. For convenience of presentation, cutting insert 50 is shown not completely inserted into the pocket. As can be seen in FIG.

2D, in the plane of the cross section, each of the rear pocket abutment surfaces 137, 138 forms an obtuse external angle with base surface 35. Similarly, each rear pocket abutment surface 157, 158 forms a corresponding obtuse internal angle with inner surface 56.

FIGS. 3A to 3D schematically show perspective, exploded views of a face grooving cutting tool 220, in accordance with an embodiment of the invention, that is a variation of the cutting tool 20 shown in FIGS. 1A to 2C.

Cutting tool 220 optionally comprises a tool body 230 and a cutting insert 250 that may be secured to the tool body 230 by clamping bolt 80. The tool body 230 may be made of a first hard material and the cutting insert 250 of a second hard material that is harder than the first hard material. For example, the tool body 230 may be made of steel and the cutting insert 250 may be made of a hard metal such as, for example, a cemented carbide.

Whereas tool body 30 in cutting tool 20 comprises a female part, socket 37, that corresponds to a male part, protuberance 60, in cutting insert 50, in cutting tool 220 tool body 230 is formed having a male protuberance 235 adjacent a front surface 229 of the tool body 230 and cutting insert 250 is formed having a matching female socket 260. Cutting insert 250 may have a mounting portion 252 similar to mounting portion 52 of cutting insert 50 of cutting tool 20 and mounting portion 252 may have a peripheral surface 256 similar to peripheral surface 58 of mounting portion 52. A cutting portion 254, having a cutting edge 255, may extend from the mounting portion 252. The cutting insert 250 has unitary integral one-piece construction with the cutting portion 254 constituting a forward portion of the cutting insert 250 and the mounting portion 252 constituting a rearward portion of the cutting insert 250. The peripheral surface 256 may extend between an inner surface 286 and an outer surface 287 of the mounting portion 252. The female socket 260 may be a recess in the inner surface 286. The female socket 260 may be adjacent the cutting portion 254. The female socket 260 may open out to the cutting portion 254. Tool body 230 of cutting tool 220 may have a pocket 234 having a back wall surface 236 similar to back wall surface 36 of tool body 30 of cutting tool 20. The back wall surface 236 is formed at a rear end 221 of pocket 234. For cutting tool 220, cutting insert 250 has rear insert abutment surfaces 257 and 258 on its peripheral surface 256 and corresponding rear pocket abutment surfaces 237 and 238 on the back wall surface 236 of its pocket 234 that are similar to rear insert abutment surfaces 157 and 158 on cutting insert 50 and rear pocket abutment surfaces 137 and 138 on the back wall surface 36 of pocket 34 of tool body 30, respectively, of cutting tool 20. Tool body 230 has a forward pocket abutment surface 240 on protuberance 235. A matching forward insert abutment surface 261 of cutting insert 250 is located in socket 260 of the insert. The insert abutment surfaces 257, 258 and 261 form first, second and third insert abutment surfaces, respectively, of the cutting insert 250 in accordance with a second embodiment and the pocket abutment surfaces 237, 238 and 240 form first, second and third pocket abutment surfaces, respectively, of pocket 234 of the tool body 230 in accordance with the second embodiment. For cutting tool 220, as with cutting tool 20, first and second rear insert abutment surfaces 257, 258 are oriented at an acute angle to each other and converge rearwardly, that is, in a direction away from the cutting edge 255. Similarly, first and second rear pocket abutment surfaces 237, 238 are oriented at an acute angle to each other and converge rearwardly, that is, a direction away from the front surface 229 of the tool body 230.

Figure 3A:
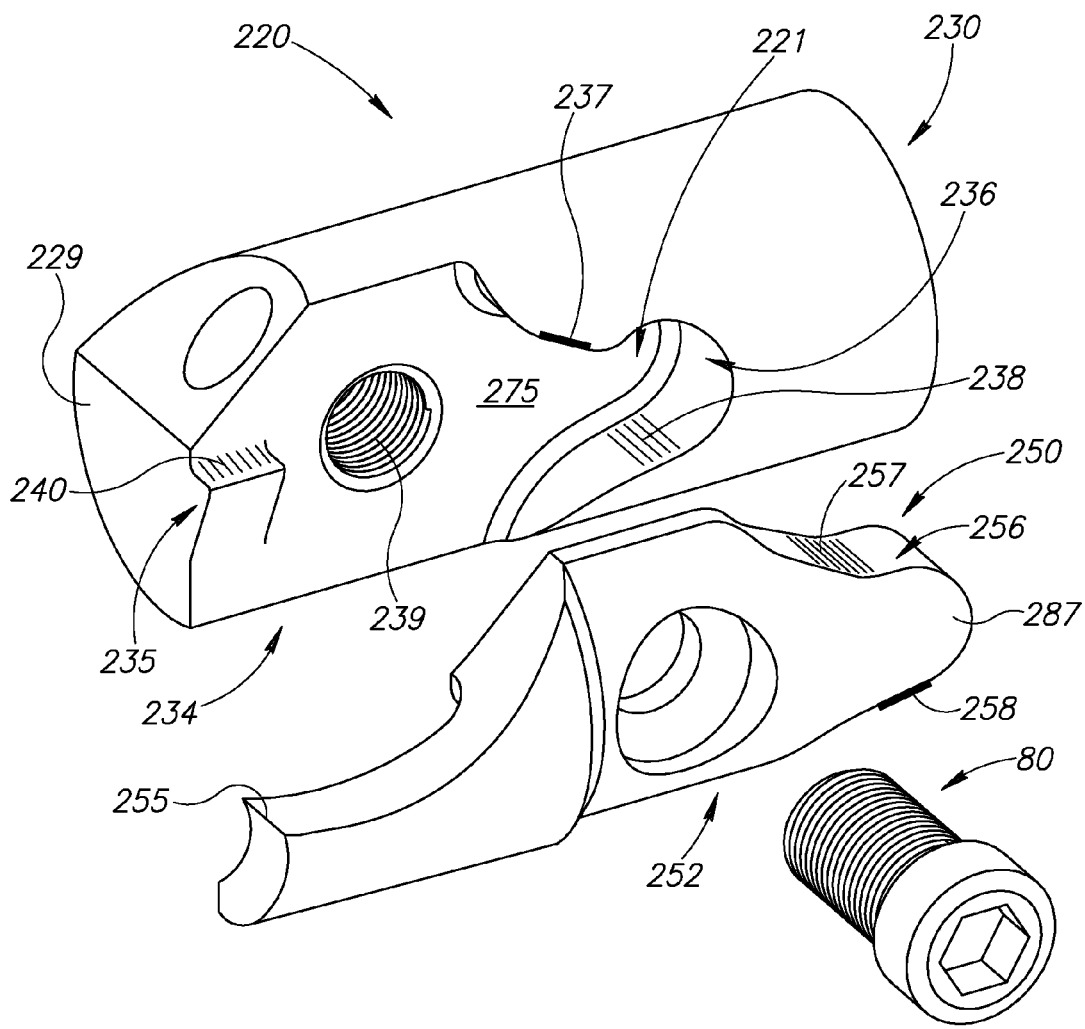
FIG. 3A schematically shows an exploded perspective of a cutting tool, in accordance with another embodiment of the invention.
Figure 3B:
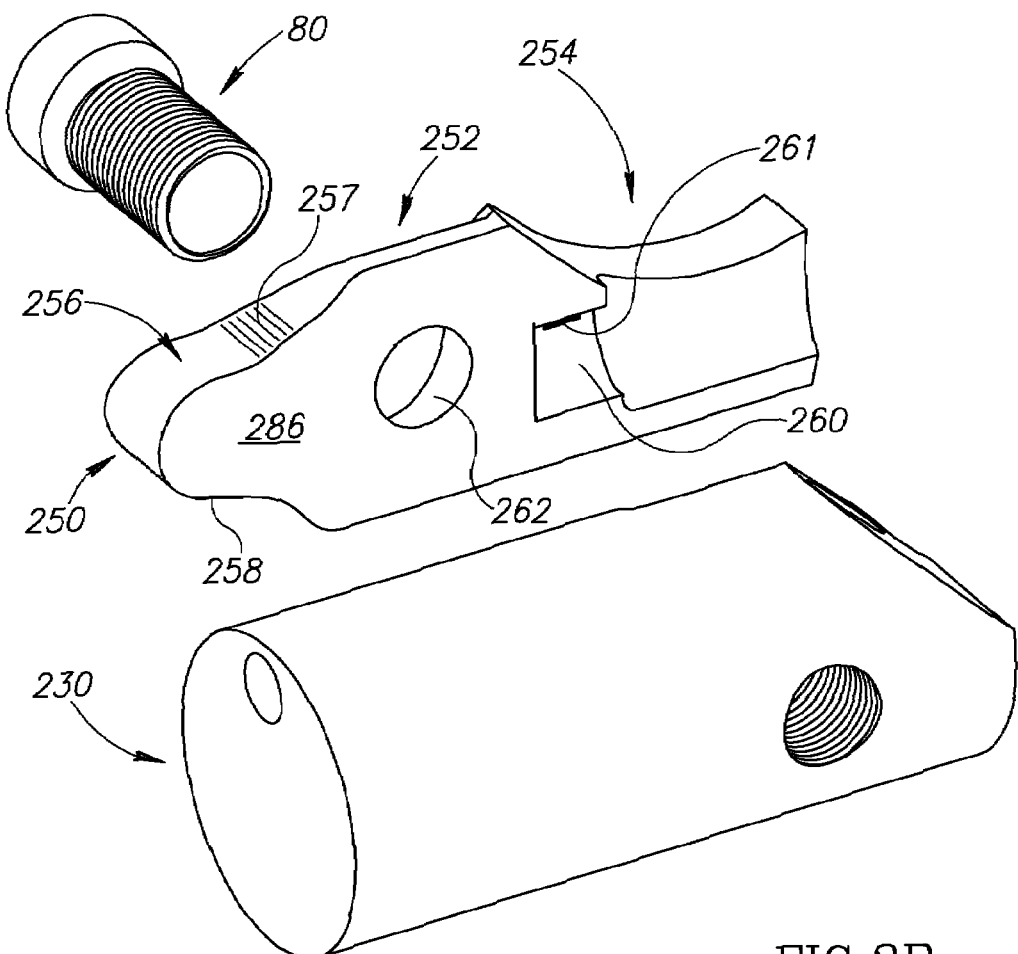
FIG. 3B schematically shows an exploded perspective view of the cutting tool shown in FIG. 3A from a substantially opposite direction.
Figure 3C:
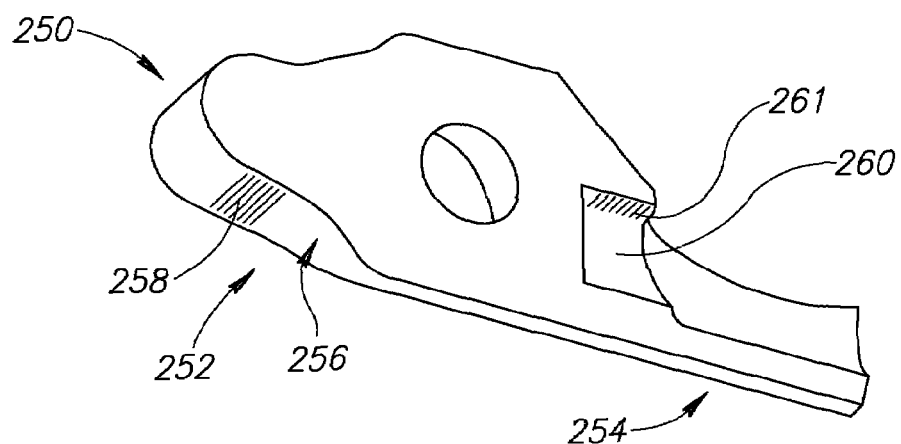
FIG. 3C schematically shows a perspective view of the cutting insert retained in the cutting tool shown in FIGS. 3A and 3B, in accordance with an embodiment of the invention.
Figure 3D:
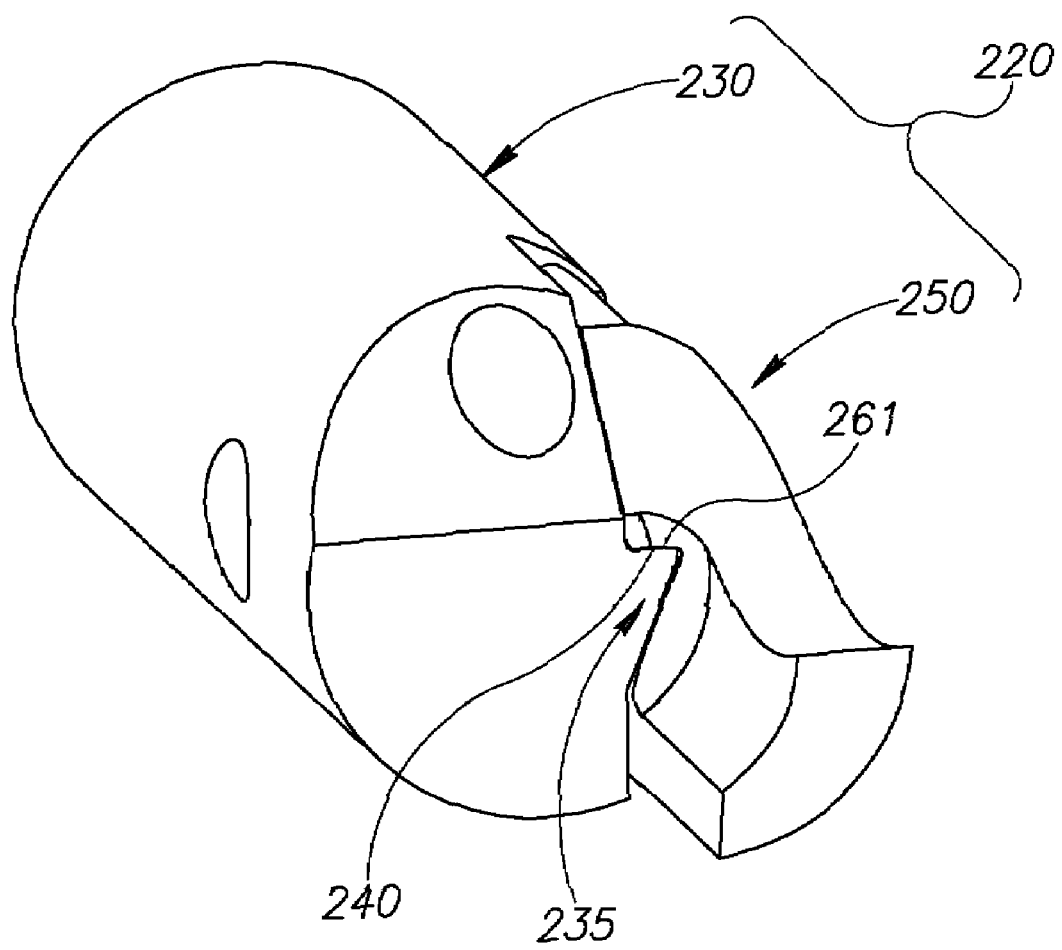
FIG. 3D schematically shows a perspective assembled view of the cutting tool shown in FIGS. 3A and 3B.

When cutting insert 250 is mounted to tool body 230, forces between first rear abutment surfaces 237 and 257 and between second rear abutment surfaces 238 and 258 generate a torque that rotates the cutting insert so that forward insert abutment surface 261 of socket 260 abuts forward pocket abutment surface 240 of protuberance 235. FIG. 3D schematically shows a perspective end view of cutting tool 220 showing abutment surface 261 abutting forward pocket abutment surface 240.

As described above, cutting tool 220 is similar to cutting tool 20. The main difference between the two cutting tools being that pocket 34 of cutting tool 20 has socket 37 at its front end, the socket 37 having forward pocket abutment surface 40, whereas cutting tool 220 has protuberance 235 at its front end, the protuberance 235 having forward pocket abutment surface 240. Forward pocket abutment surface 40 is adjacent base surface 35 of pocket 34 and forward pocket abutment surface 240 is adjacent base surface 275 of pocket 234. The main difference between the two abutment surfaces being that forward pocket abutment surface 40 is recessed relative to base surface 35 whereas forward pocket abutment surface 240 protrudes relative to base surface 275. Correspondingly, in the main difference between cutting insert 50 and cutting insert 250 is that cutting insert 50 has a protuberance 60 adjacent the cutting portion 54 whereas cutting insert 250 has a socket 260 adjacent the cutting portion 254.

In the present invention, the pocket abutment surfaces 137, 138 and 237, 238 in the back walls 36 and 236, respectively, are situated axially rearward of the threaded bores 39 and 239. This means that the back walls 36, 236 may be terminated axially rearward of the threaded bores 39 and 239, respectively. Consequently, the base surfaces 35, 275 in the region of the threaded bores 39 and 239, respectively, may extend outward to the peripheral surface of the mounting shanks, thereby leaving a greater area for the mounting portions 52, 252 of the cutting inserts 50, 250 in regions around the through bores 62, 262, respectively. This results in stronger mounting portions 52, 252 whilst still enabling secure clamping of the cutting insert and relatively small diameter cutting tools. If the rear pocket abutment surfaces 137, 138 and 237, 238 were not situated axially rearward of the threaded bores 39 and 239 then the back walls 36, 236 could not be terminated axially rearward of the threaded bores 39 and 239 and in order to use the same size cutting inserts 50, 250, the diameter cutting tools would have to be increased.

Figure 4A:
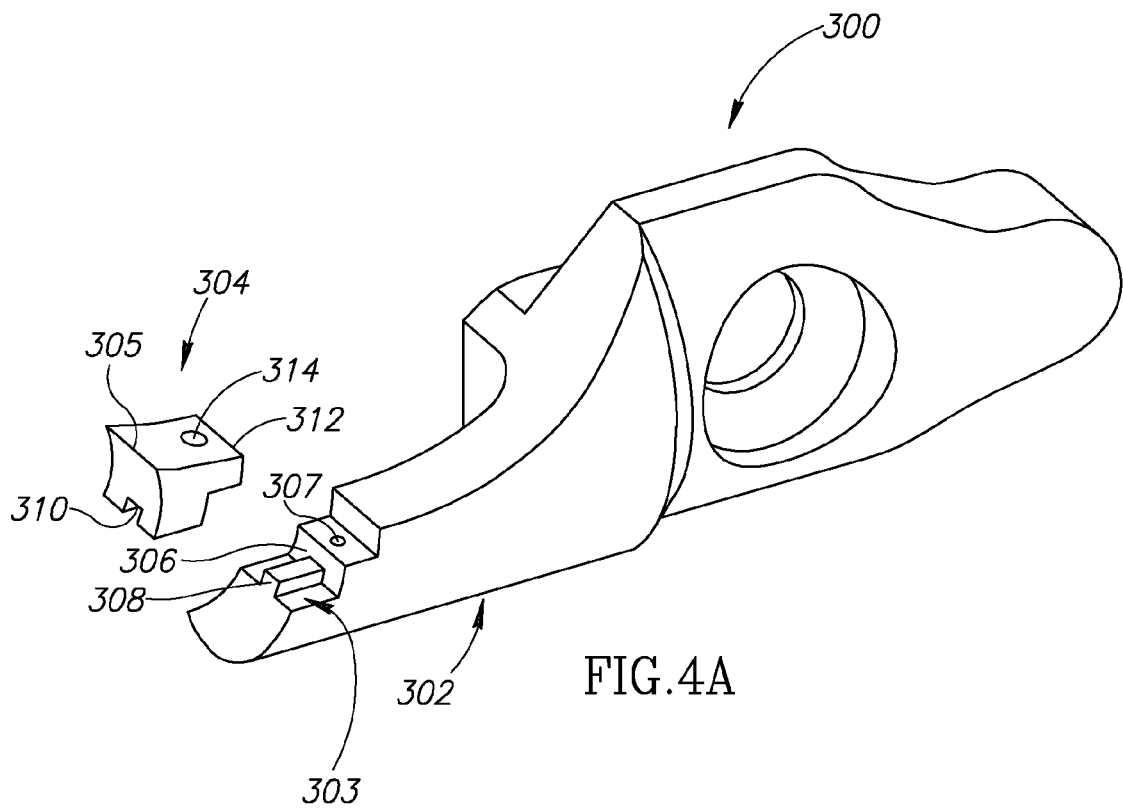
FIG. 4A schematically shows an exploded view of a cutting insert comprising a blade configured to receive a replaceable cutting tip, in accordance with an embodiment of the invention.
Figure 4B:
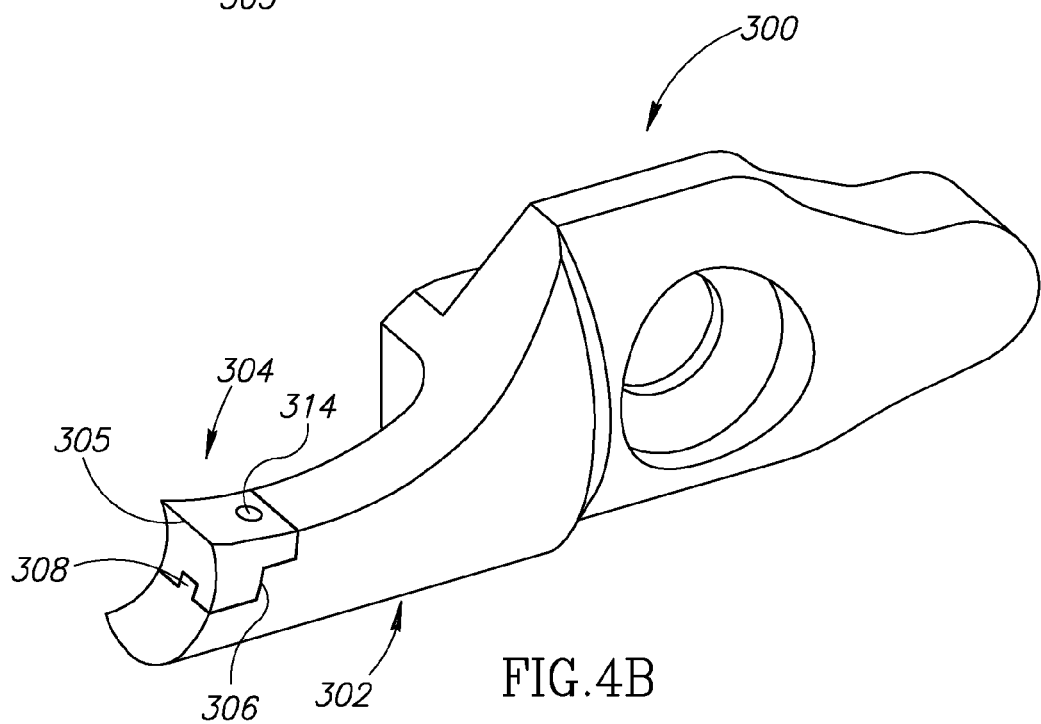
FIG. 4B schematically shows an assembled view of the cutting insert shown in FIG. 4A.

Whereas in the above figures and description cutting inserts 50 and 250 are integrally formed having cutting edges 55 and 255, respectively, in some embodiments of the invention the cutting inserts 50 and 250 may have cutting edges formed on a relatively easily replaceable cutting tip. FIGS. 4A and 4B schematically show an exploded and assembled view of a cutting insert 300 similar to cutting insert 50 but wherein the cutting portion 302 has at its forward end a tip pocket 303 configured to receive a replaceable cutting tip 304 having a cutting edge 305, in accordance with an embodiment of the invention. The cutting insert 300 may be made of a first material such as steel and the cutting tip 304 may be made of a harder material, such as cemented carbide. Tip pocket 303 optionally comprises an alignment ridge 308 and a mounting seat 306 having a threaded bore 307 formed therein. Replaceable cutting tip 304 is formed having an alignment groove 310 that matches ridge 308 and a mounting extension 312 that matches mounting seat 306 and is formed having a through hole 314.

Replaceable cutting tip 304 is mounted to tip pocket 303 by positioning the tip with ridge 308 inserted into groove 310 and optionally clamping mounting extension 312 to mounting seat 306 by passing a suitable bolt through hole 314 and screwing the bolt into threaded bore 307.

It is noted that whereas the examples of embodiments of the invention shown in the figures and as described above relate to a cutting tool for cutting grooves, practice of the invention is not limited to groove-cutting tools. For example, cutting tools and tool bodies similar to that shown above may be configured for face-shaping or parting. In addition, whereas tool body 30 is shown as a single integral component a tool body similar to tool body 30 may comprise a plurality of components. For example, a tool body in accordance with an embodiment of the invention may comprise a first component having a pocket such as pocket 34 and be configured to be connected to a shank for mounting to a machine tool. The first component may be mounted to different shanks for mounting to different machine tools.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons of the art.

What is claimed is:

1. A cutting tool comprising:
    a cutting insert comprising a cutting portion and a mounting portion, the mounting portion comprising:
        inner and outer surfaces and a peripheral surface extending therebetween;
        a through bore passing through the inner and outer surfaces;
        first and second insert abutment surfaces located on the peripheral surface, the first and second insert abutment surfaces being situated at a greater distance from the cutting portion than the through bore; and
        a third insert abutment surface located adjacent the inner surface but spaced apart from the peripheral surface and situated closer to the cutting portion than the through bore;
    and
    a tool body having a pocket comprising:
        a base surface;
        a back wall surface oriented transversely to the base surface and forming a partial boundary of the base surface at a rear end of the pocket;
        first and second pocket abutment surfaces situated on the back wall surface;
        a third pocket abutment surface oriented transversely to the base surface and spaced apart from the back wall surface; and
        a threaded bore in the base surface situated closer to a front surface of the tool body than the first and second pocket abutment surfaces and further from the front surface than the third pocket abutment surface;
    wherein:
        the cutting insert is releasably retained in the pocket by a clamping bolt located in the through bore and threadingly received in the threaded bore; and
        the first, second and third insert abutment surfaces abut the first, second and third pocket abutment surfaces, respectively.

2. The cutting tool according to claim 1, wherein the third insert abutment surface is situated in a socket recessed in the inner surface of the mounting portion of the cutting insert.

3. The cutting tool according to claim 1, wherein the third pocket abutment surface is located on a protuberance protruding from the base surface of the pocket.

4. The cutting tool according to claim 1, wherein the third insert abutment surface is situated on a protuberance protruding from the inner surface of the mounting portion of the cutting insert.

5. The cutting tool according to claim 1, wherein the third pocket abutment surface is situated in a socket recessed in the base surface of the pocket.

6. The cutting tool according to claim 1, wherein:
    the cutting portion constitutes a forward portion of the insert and comprises at least one cutting edge;
    the mounting portion constitutes a rearward portion of the insert; and
    the first and second insert abutment surfaces are oriented at an acute angle to each other and converge in a direction away from the cutting edge.

7. The cutting tool according to claim 1, wherein:
    the first and second pocket abutment surfaces are oriented at an acute angle to each other and converge in a direction away from the front surface of the tool body.

8. A cutting insert comprising a cutting portion and a mounting portion, the mounting portion comprising:
    inner and outer surfaces and a peripheral surface extending therebetween;
    a through bore passing through the inner and outer surfaces;
    first and second insert abutment surfaces located on the peripheral surface, the first and second insert abutment surfaces being situated at a greater distance from the cutting portion than the through bore; and
    a third insert abutment surface located adjacent the inner surface but spaced apart from the peripheral surface and situated closer to the cutting portion than the through bore.

9. The cutting insert according to claim 8, wherein the third insert abutment surface is situated in a socket recessed in the inner surface of the mounting portion of the cutting insert.

10. The cutting insert according to claim 8, wherein the third insert abutment surface is situated on a protuberance protruding from the inner surface of the mounting portion of the cutting insert.

11. The cutting insert according to claim 8, wherein:
    the cutting portion constitutes a forward portion of the insert and comprises at least one cutting edge;
    the mounting portion constitutes a rearward portion of the insert; and
    the first and second insert abutment surfaces are oriented at an acute angle to each other and converge, in a direction away from the cutting edge.

12. The cutting insert according to claim 8, comprising a unitary integral one-piece construction with the cutting portion constituting a forward portion of the cutting insert and the mounting portion constituting a rearward portion of the cutting insert.

13. The cutting insert according to claim 8, comprising a tip pocket at a forward end of the cutting portion and a cutting tip releasably retained therein, the cutting insert being made of a first material and the cutting tip being made of a second harder material.

14. A tool body having a pocket comprising:
   a base surface;
   a back wall surface oriented transversely to the base surface and forming a partial boundary of the base surface at a rear end of the pocket;
   first and second pocket abutment surfaces situated on the back wall surface;
   a third pocket abutment surface oriented transversely to the base surface and spaced apart from the back wall surface; and
   a threaded bore in the base surface situated closer to a front surface of the tool body than the first and second pocket abutment surfaces and further from the front surface than the third pocket abutment surface.

15. The tool body according to claim 14, wherein the third pocket abutment surface is located on a protuberance protruding from the base surface of the pocket.

16. The tool body according to claim 14, wherein the third pocket abutment surface is situated in a socket recessed in the base surface of the pocket.

17. The tool body according to claim 14, wherein:
   the first and second pocket abutment surfaces are oriented at an acute angle to each other and converge in a direction away from the front surface of the tool body.

* * * * *